United States Patent
Mallozzi

(10) Patent No.: US 9,977,911 B2
(45) Date of Patent: May 22, 2018

(54) METHODS AND SYSTEMS FOR MANAGING PERMISSIONS TO ACCESS MOBILE DEVICE RESOURCES

(71) Applicant: Facebook, Inc., Menlo Park, CA (US)

(72) Inventor: Matthew Robert Mallozzi, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

(21) Appl. No.: 14/586,072

(22) Filed: Dec. 30, 2014

(65) Prior Publication Data

US 2016/0191534 A1 Jun. 30, 2016

(51) Int. Cl.
*H04L 29/06* (2006.01)
*G06F 21/62* (2013.01)
*G06F 21/60* (2013.01)

(52) U.S. Cl.
CPC ........ *G06F 21/6218* (2013.01); *G06F 21/604* (2013.01); *G06F 21/629* (2013.01)

(58) Field of Classification Search
None
See application file for complete search history.

(56) References Cited

U.S. PATENT DOCUMENTS

| | | | | |
|---|---|---|---|---|
| 6,678,824 | B1 * | 1/2004 | Cannon | A63F 13/10 |
| | | | | 705/59 |
| 8,255,991 | B1 * | 8/2012 | Hackborn | G06F 8/61 |
| | | | | 713/167 |
| 8,656,465 | B1 | 2/2014 | Fong-Jones | |
| 9,053,337 | B2 * | 6/2015 | Carrara | G06F 21/6218 |
| 9,230,134 | B1 * | 1/2016 | Grigera | G06F 21/51 |
| 2009/0292927 | A1 * | 11/2009 | Wenzel | H04L 63/0815 |
| | | | | 713/185 |
| 2010/0162266 | A1 * | 6/2010 | Davis | G06F 9/546 |
| | | | | 719/316 |
| 2010/0242097 | A1 | 9/2010 | Hotes et al. | |

(Continued)

FOREIGN PATENT DOCUMENTS

| WO | WO 02075547 A1 | 9/2002 |
|---|---|---|
| WO | WO 2012048087 A2 | 4/2012 |
| WO | WO 2013003079 A2 | 1/2013 |

OTHER PUBLICATIONS

Facebook Inc., International Search Report and Written Opinion, PCT/US2014/073059, dated Jul. 31, 2015, 10 pgs.
Facebook, Extended European Search Report, EP15177460.1, dated May 31, 2016, 11 pgs.
Kern et al., Permission Tracking in Android, Sep. 30, 2012, retrieved from the internet: https://www.researchgate.net/profile/johannes_Sametinger/publication/267705493_Permission_Tracking_in_Android/links/548ef6770cf214269f2631b4.pdf, 9 pg.

(Continued)

*Primary Examiner* — Michael R Vaughan
(74) *Attorney, Agent, or Firm* — Morgan, Lewis & Bockius LLP

(57) ABSTRACT

In an electronic device, a first application sends a request to a second application for access by the first application to a resource of the electronic device, wherein the first and second applications run on an operating system of the electronic device. In response to the first request, the second application is used to ask a user of the electronic device for permission for the first application to access the resource. A first user input is received, providing permission for the first application to access the resource. In response to the first user input, the second application is used to grant permission to the first application to access the resource.

16 Claims, 7 Drawing Sheets

(56) References Cited

U.S. PATENT DOCUMENTS

| | | | |
|---|---|---|---|
| 2010/0251340 A1* | 9/2010 | Martin | G06F 21/51 |
| | | | 726/4 |
| 2011/0138370 A1* | 6/2011 | Albert | G06F 9/541 |
| | | | 717/136 |
| 2011/0173674 A1* | 7/2011 | Thomson | H04L 29/12669 |
| | | | 726/1 |
| 2011/0265189 A1* | 10/2011 | Liao | G06F 21/6227 |
| | | | 726/28 |
| 2012/0268360 A1 | 10/2012 | Mikhailov | |
| 2013/0055387 A1* | 2/2013 | Kim | G06F 21/55 |
| | | | 726/22 |
| 2014/0059695 A1 | 2/2014 | Parecki et al. | |
| 2015/0121478 A1* | 4/2015 | Huang | H04L 63/0823 |
| | | | 726/4 |
| 2015/0339482 A1* | 11/2015 | Wurster | G06F 21/62 |
| | | | 726/30 |

OTHER PUBLICATIONS

Rashidi et al., "RecDroid," Security and Privacy in Mobile Environments, ACM, 2 Penn Plaza, Suite 701, New York, NY 10121-0701, Sep. 11, 2014, 5 pgs.

Facebook, Inc. International Search Report and Written Opinion, PCT/US2014/073059, dated Jul. 31, 2015, 10 pgs.

Facebook, Inc. International Preliminary Report on Patentability, PCT/US2014/073059, dated Jul. 4, 2017, 7 pgs.

* cited by examiner

Permission Table 344

| Application ID | Resource | Permission | Date/Time of Permission | Duration | Location | User | Location Resolution | Foreground/ Background |
|---|---|---|---|---|---|---|---|---|
| 01 | GPS | Grant | 11-25-2014 02:05:00 | Always | - | User_01 | 2000 ft | Foreground |
| 02 | Camera | Deny | | Deny | - | User_01 | - | - |
| ... | ... | ... | ... | ... | ... | ... | ... | ... |

FIGURE 5A

Records Table 346

| Request Index # | Application ID | Resource | Date/Time of Request | Requesting User | Location of Request | Result of Request |
|---|---|---|---|---|---|---|
| 001 | 01 | GPS | 11-25-2014 02:05:00 | User_01 | 37.420591, -122.141330 | Grant |
| 002 | 01 | GPS | 11-25-2014 08:01:23 | User_01 | 37.762731, -122.431777 | Grant |
| ... | ... | ... | ... | ... | ... | ... |

FIGURE 5B

METHODS AND SYSTEMS FOR MANAGING PERMISSIONS TO ACCESS MOBILE DEVICE RESOURCES

TECHNICAL FIELD

This relates generally to managing permissions of applications in a mobile device, including but not limited to managing permissions to access mobile device resources.

BACKGROUND

Both the abundance of mobile device applications and the range of resources and capabilities provided by mobile devices continue to grow. Providing secure access to the device resources used by mobile device applications has increasingly become a concern for consumers. Consumers may be unwilling to use an application if they do not trust the application to access device resources in an appropriate manner that respects consumer privacy. The issue of trusted access by applications is further complicated by the lack of granular permission management capabilities and the challenges of monitoring and acting upon observed resource access behaviors.

SUMMARY

Accordingly, there is a need for methods, systems, and interfaces for managing permissions to access mobile device resources. By using an application separate from an operating system to receive access requests from requesting applications, to ask users for permissions, and to grant or deny permission to the requesting applications in accordance with permissions provided by the users, access to device resources is more securely managed and monitored. Such methods, systems, and interfaces optionally complement or replace conventional methods for managing permissions to access mobile device resources.

In accordance with some embodiments, a method is performed at an electronic device (e.g., a mobile device) with one or more processors and memory storing instructions for execution by the one or more processors. The method includes sending a first request from a first application to a second application for access by the first application to a resource of the electronic device, wherein the first and second applications run on an operating system of the electronic device. In response to the first request, the second application is used to ask a user of the electronic device for permission for the first application to access the resource. A first user input is received, providing permission for the first application to access the resource. In response to the first user input, the second application is used to grant permission to the first application to access the resource.

In accordance with some embodiments, an electronic device (e.g., a client device, such as a mobile device) includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above. In accordance with some embodiments, an electronic device includes means for performing the operations of the method described above.

Thus, by using an application that is separate from the operating system, and that acts as a proxy for managing and monitoring permission settings, the application is divorced from new releases and updates to the operating system, thereby enabling compatibility with a wider range of devices than may otherwise be feasible if implemented by the operating system itself. Furthermore, a separate proxy application allows for the development and following of an API that allows transparency/accountability that the operating system developer may not otherwise provide with respect to permissions usage. Electronic devices are therefore also provided with more efficient and trustworthy methods for managing permissions to access mobile device resources, thereby increasing the effectiveness, efficiency, and user satisfaction with such devices.

Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In some embodiments, a method comprises
at an electronic device with one or more processors and memory storing instructions for execution by the one or more processors:
  sending a first request from a first application to a second application for access by the first application to a resource of the electronic device, wherein the first and second applications run on an operating system of the electronic device;
  in response to the first request, using the second application to ask a user of the electronic device for permission for the first application to access the resource;
  receiving a first user input providing permission for the first application to access the resource; and
  in response to the first user input, using the second application to grant permission to the first application to access the resource.

The resource may be selected from the group consisting of:
a microphone of the electronic device;
a messaging application of the electronic device;
a location-tracking device of the electronic device; and
a camera of the electronic device.

Using the second application to grant permission to the first application to access the resource may comprise:
using the second application to retrieve data from the resource; and
providing the data from the second application to the first application.

The first user input may specify a one-time permission for the first application to access the resource, the method further may comprise, after receiving the first user input and using the second application to grant permission to the first application to access the resource in response to the first user input:

sending a second request from the first application to the second application for access by the first application to the resource;

in response to the second request, using the second application to ask the user for permission for the first application to access the resource;

receiving second user input indicating whether to grant permission to the first application to access the resource; and using the second application to grant or deny permission to the first application to access the resource, in accordance with the second user input.

In some embodiments, the method further may comprise determining, in response to the first request, that the second application is not currently authorized to allow the first application to access the resource;

wherein the user is asked for permission for the first application to access the resource in response to the determining.

The first user input may specify a time period in which to permit the first application to access the resource, the method further may comprise:

during the time period, repeatedly using the second application to automatically grant permission to the first application to access the resource, in accordance with the first user input.

The first user input may specify a permitted location at which to permit the first application to access the resource, the method further may comprise:

while a detected location of the electronic device corresponds to the permitted location, repeatedly using the second application to automatically grant permission to the first application to access the resource, in accordance with the first user input.

The first user input may specify a permitted user for whom the first application is authorized to access the resource, the method further may comprise:

when the user of the electronic device is determined to be the permitted user, repeatedly using the second application to automatically grant permission to the first application to access the resource, in accordance with the first user input.

The first user input may specify a condition under which to grant permission to the first application to access the resource; and the method further may comprise:

storing the condition in memory allocated to the second application; and in the second application, using the condition to determine whether to grant permission to the first application to access the resource in response to subsequent requests from the first application.

The condition may allow access to the resource by a foreground process corresponding to the first application but not to a background process corresponding to the first application.

The condition may allow access to the resource by a background process corresponding to the first application but not to a foreground process corresponding to the first application.

The resource may comprise a location-tracking device of the electronic device; and the first user input may specify a degree of resolution to be allowed for the first application with respect to accessing the location-tracking device.

The first user input may select between a coarse or fine resolution for location tracking.

In some embodiments, the method further may comprise: determining a number of requests sent by the first application to access the resource over a period of time; and in accordance with the number of requests satisfying a threshold, using the second application to deny permission to the first application to access the resource.

In some embodiments, the method further may comprise, in accordance with the number of requests satisfying the threshold, providing an alert to the user of the electronic device.

In some embodiments, the method further may comprise: sending a plurality of requests from the first application to the second application for access by the first application to the resource, the plurality of requests including the first request;

storing records of the plurality of requests; and based on the records, presenting one or more statistics regarding the plurality of requests to the user.

In some embodiments, the method further may comprise: sending a plurality of requests from the first application to the second application for access by the first application to the resource, the plurality of requests including the first request;

in response to respective requests of the plurality of requests, asking the user for permission for the first application to access the resource and receiving respective user inputs granting or denying permission for the first application to access the resource;

storing records of the respective requests, respective user inputs, and respective context information for the electronic device; and based on the records, presenting a recommendation to the user of a condition under which to grant or deny permission for the first application to access the resource.

The context information may comprise at least one of locations of the electronic device when receiving the respective user inputs and times at which the respective user inputs are received.

In some embodiments, which can be claimed as well, an electronic device comprises:

one or more processors; and memory for storing one or more programs for execution by the one or more processors, the one or more programs including instructions for:

sending a first request from a first application to a second application for access by the first application to a resource of the electronic device, wherein the first and second applications run on an operating system of the electronic device;

in response to the first request, using the second application to ask a user of the electronic device for permission for the first application to access the resource; and in response to a first user input providing permission for the first application to access the resource, using the second application to grant permission to the first application to access the resource.

In some embodiments, which can be claimed as well, a non-transitory computer-readable storage medium stores one or more programs for execution by one or more processors of an electronic device, the one or more programs corresponding to a second application distinct from a first application and from an operating system of the electronic device on which the first and second applications are configured to run, the one or more programs include instructions for:

receiving a request from the first application for access by the first application to a resource of the electronic device;

in response to the first request, asking a user of the electronic device for permission for the first application to access the resource; and in response to a first user input providing permission for the first application to access the resource, granting permission to the first application to access the resource.

In some embodiments, one or more computer-readable non-transitory storage media embody software that is operable when executed to perform a method according to any of the above mentioned embodiments or any other disclosed embodiments.

In some embodiments, a system comprises: one or more processors; and at least one memory coupled to the processors and comprising instructions executable by the processors, the processors operable when executing the instructions to perform a method according to any of the above mentioned embodiments or any other disclosed embodiments.

In some embodiments, a computer program product, preferably comprising a computer-readable non-transitory storage media, is operable when executed on a data processing system to perform a method according to any of the above mentioned embodiments or any other disclosed embodiments.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 5A-5B illustrate exemplary data structures storing permissions and access request records, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first group could be termed a second group, and, similarly, a second group could be termed a first group, without departing from the scope of the various described embodiments. The first group and the second group are both groups, but they are not the same group.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
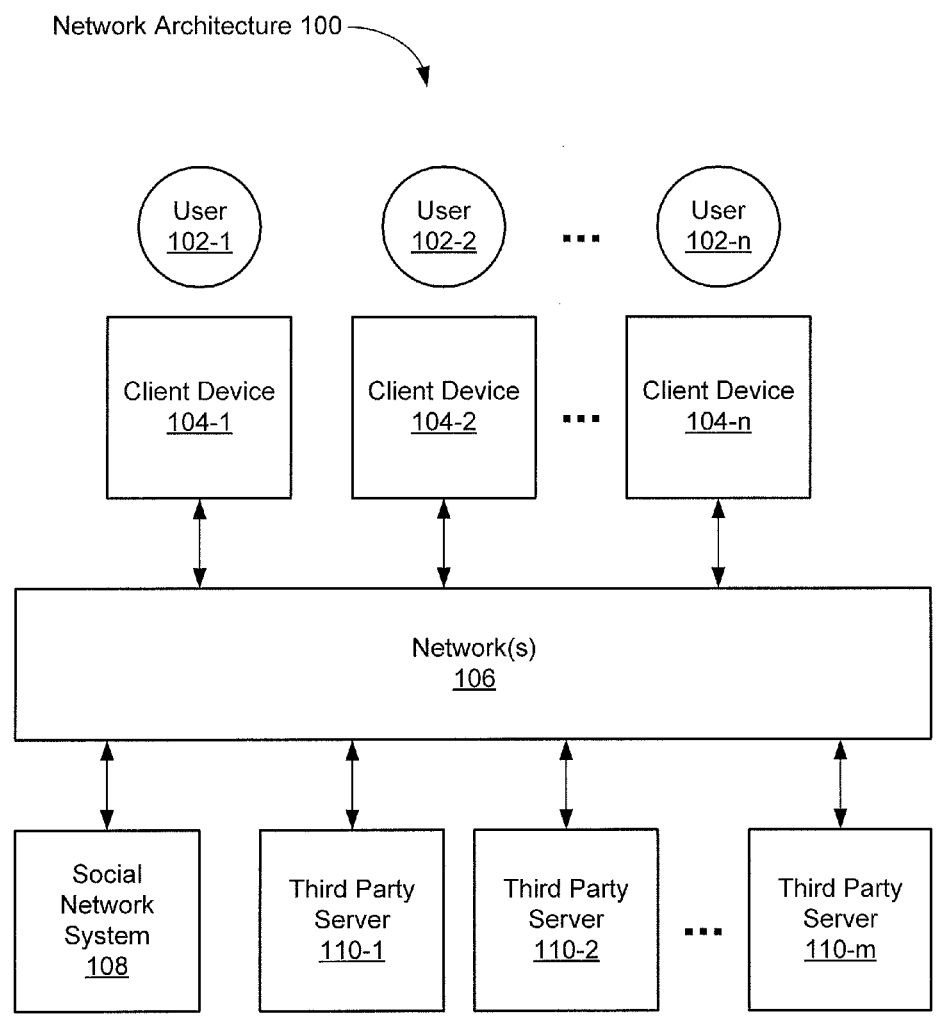
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. Some or all of the client devices 104-1, 104-2, . . . 104-n thus may be mobile devices. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by providing and/or consuming (e.g., posting, writing, viewing, publishing, broadcasting, promoting, recommending, sharing) digital information, such as text comments (e.g., statuses, updates, announcements, replies, location "check-ins," private/group messages), photos, videos, audio files, links, documents, and/or other electronic content. In some embodiments, users interact with a page, group, event, message board, feed, application, and/or user profile of a social-networking service provided by the social network system 108. Users of the social-networking service can annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
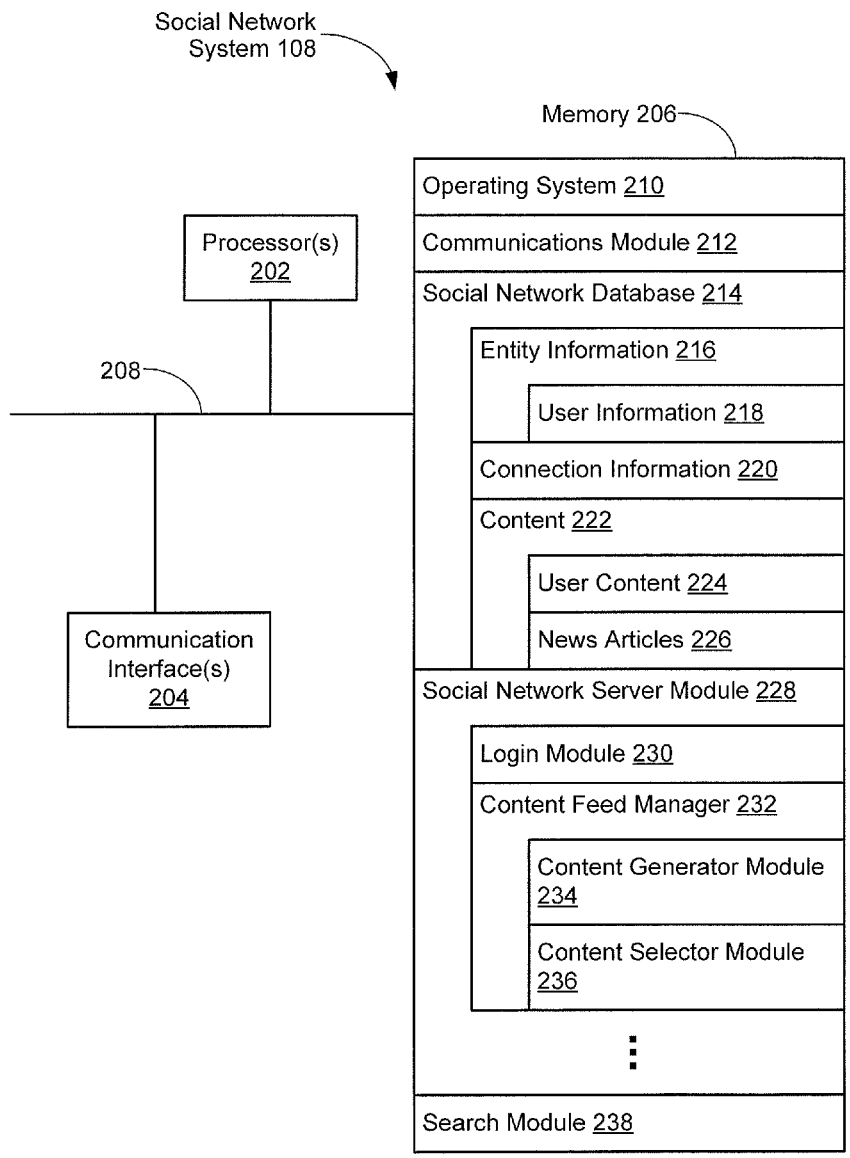
FIG. 2 is a block diagram illustrating an exemplary social-network system in accordance with some embodiments.

FIG. 2 is a block diagram illustrating an exemplary social-network system 108 in accordance with some embodiments. The social-network system 108 is a server system that typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
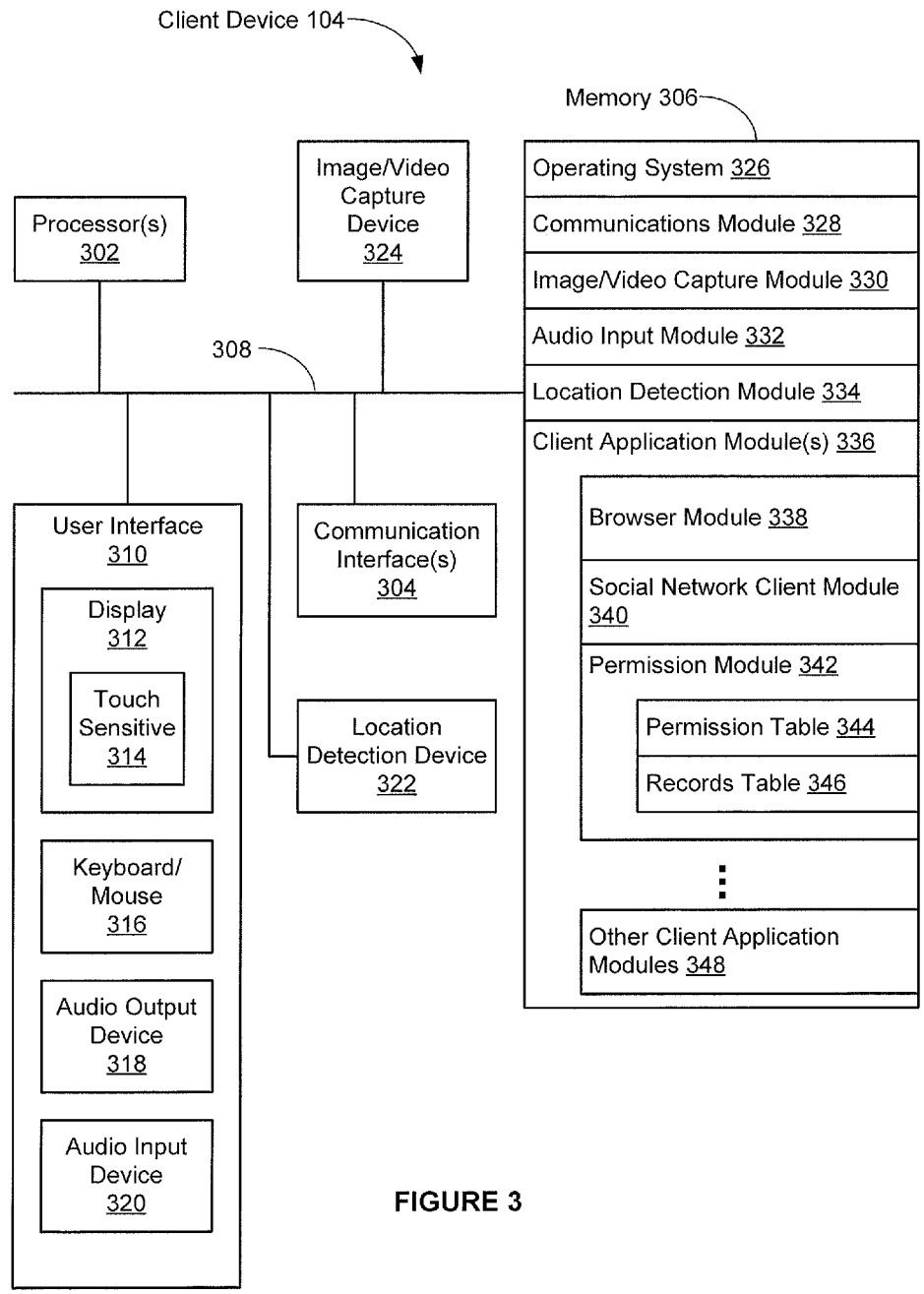
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social network database 214 for storing data associated with the social network, such as:
  - entity information 216, such as user information 218;
  - connection information 220; and
  - content 222, which includes:
    - user content 224, such as text comments (e.g., posts, statuses, updates, announcements, replies, location "check-ins," private/group messages), photos, videos, audio files, links, documents, and/or other digital electronic content; and/or
news articles 226;
a social network server module 228 for providing social-networking services, social-media applications, and related features (e.g., in conjunction with browser module 338 or social network client module 340 on the client device 104, FIG. 3), which includes:
a login module 230 for logging a user 102 at a client 104 into the social-network system 108; and
a content feed manager 232 for providing content to be sent to clients 104 for display, which includes:
a content generator module 234 for describing objects in the social network database 214, such as images, videos, audio files, comments, status messages, links, applications, and/or other entity information 216, connection information 220, or content 222; and
a content selector module 236 for choosing the information/content to be sent to clients 104 for display; and
a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 (e.g., a mobile device) in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108),
  - a social network client module 340 for providing an interface to a social network (e.g., a social network provided by social-network system 108), social-media applications, and related features;
  - a permission module 342 for managing permissions for applications to access resources (e.g., audio input device 320, location detection device 322, image/video capture device 324, and/or respective modules in the memory 306) of the client device 104, which includes:
    - a permission table 344 for storing permissions and conditions for applications to access resources; and
    - a records table 346 for storing records of access requests sent by applications, user inputs received in response to access requests, and context information for the client device 104 at times when the access requests are made and/or the user inputs are received; and/or
  - other optional client application modules 348, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, permission module 342 is configured to ask (e.g., by displaying a GUI 400, FIG. 4A) a user of the client device 104 for permission for an application (e.g., a client application module 336) to access a resource of the client device 104. Permission module 342 also receives user inputs granting/denying permission to applications to access resources, and also grants/denies permission to the applications in response to the received user inputs. In some embodiments, permission module 342 retrieves data from a resource and provides the retrieved data to a requesting application. Furthermore, in some embodiments, permission module 342 manages user-specified conditions under which to grant or deny permission (e.g., permitted locations, permitted users, one-time permissions, location resolution, etc.), and uses the conditions to grant or deny permission accordingly. In some implementations, permission module 342 determines whether a number of access requests sent by an application satisfy a threshold, and accordingly denies permission to the application and/or provides an alert to the user. In some embodiments, based on stored records (e.g., in records table 346), permission module 342 presents statistics regarding multiple access requests, and/or presents recommendations to the user of conditions under which to grant or deny permissions for applications to access device resources.

Each of the above-identified modules and applications corresponds to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4A:
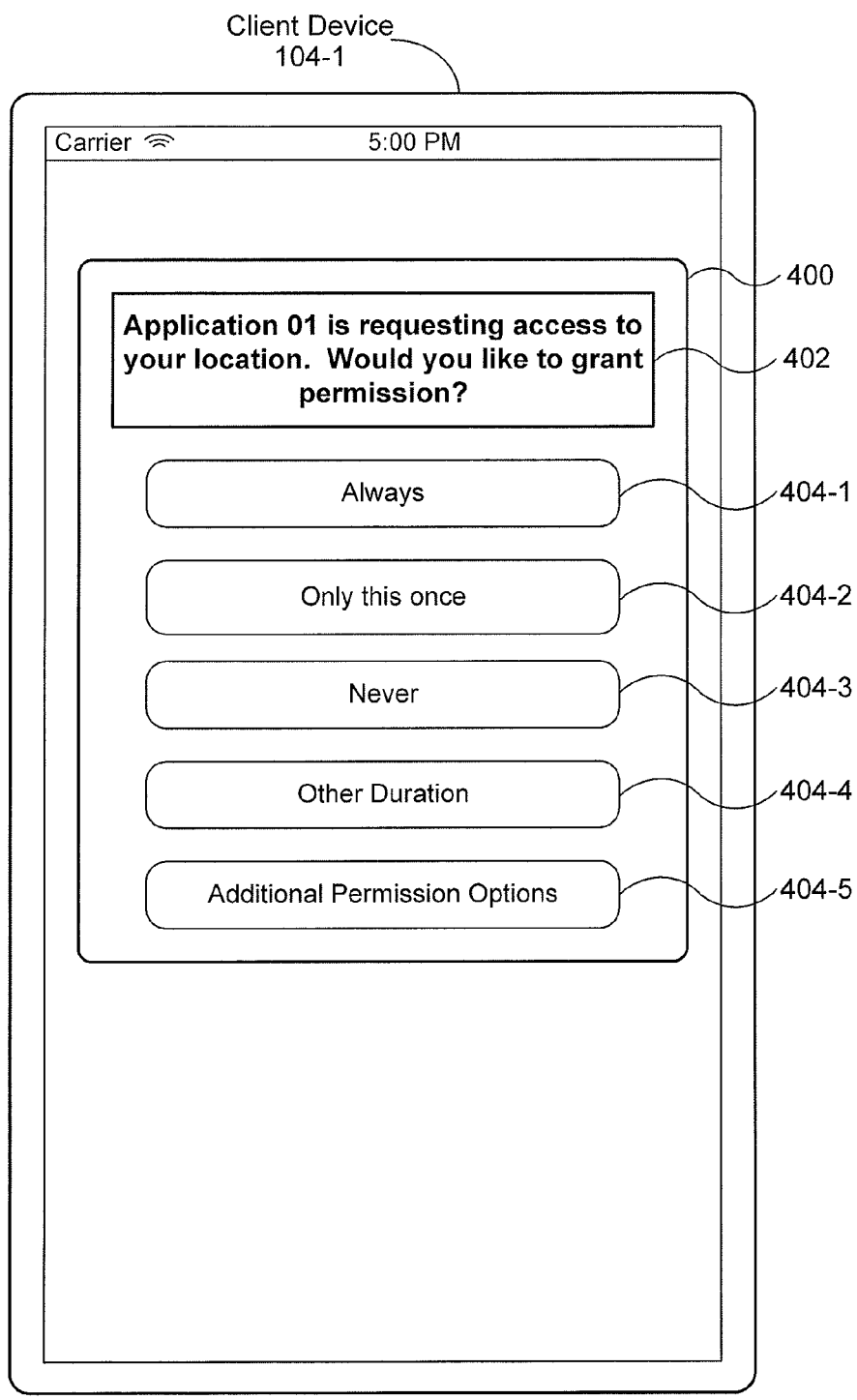
FIGS. 4A-4B illustrate exemplary graphical user interfaces (GUIs) for managing permissions to access device resources and presenting access request statistics, in accordance with some embodiments.
Figure 4B:
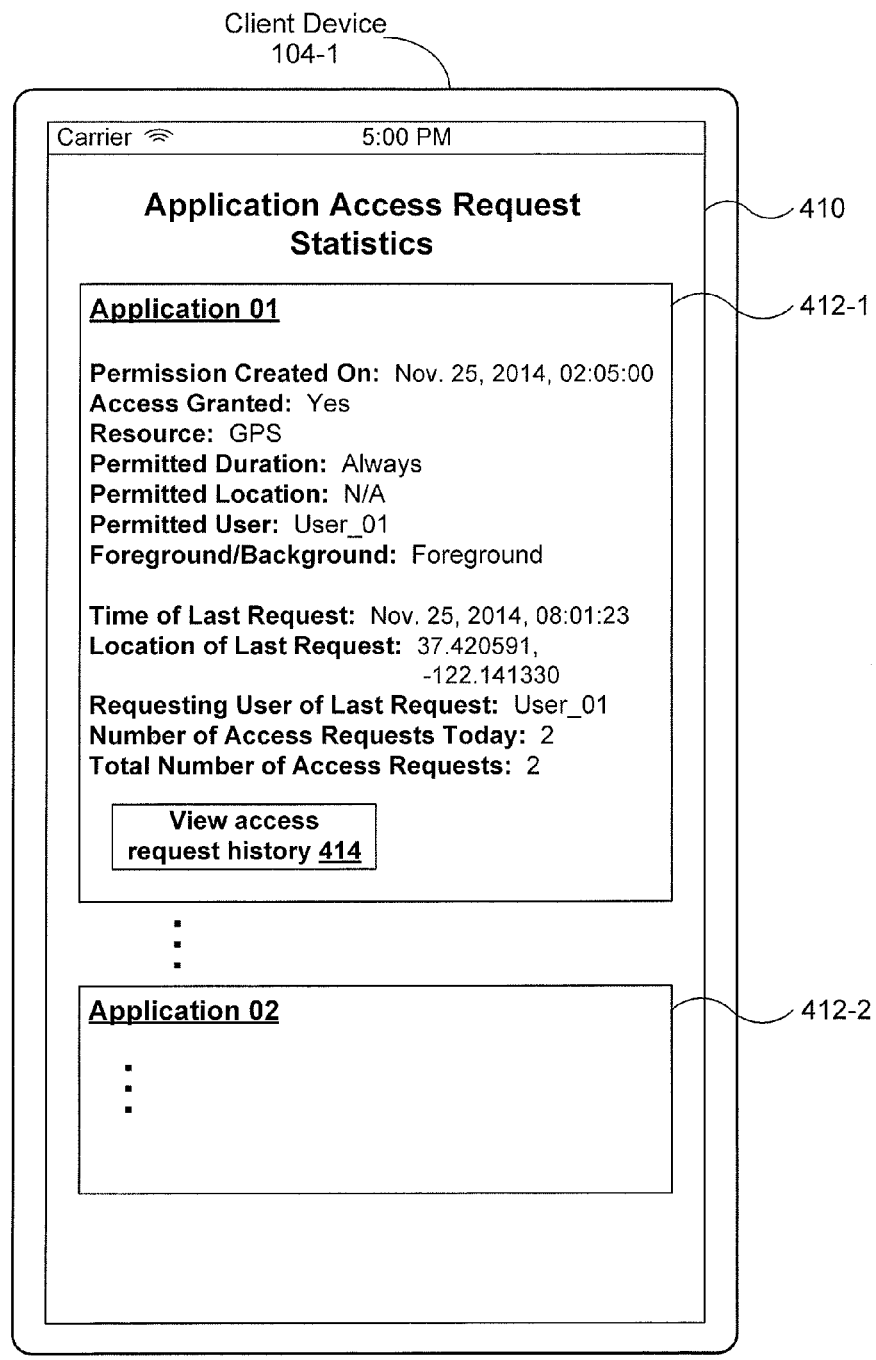
Figure 6:
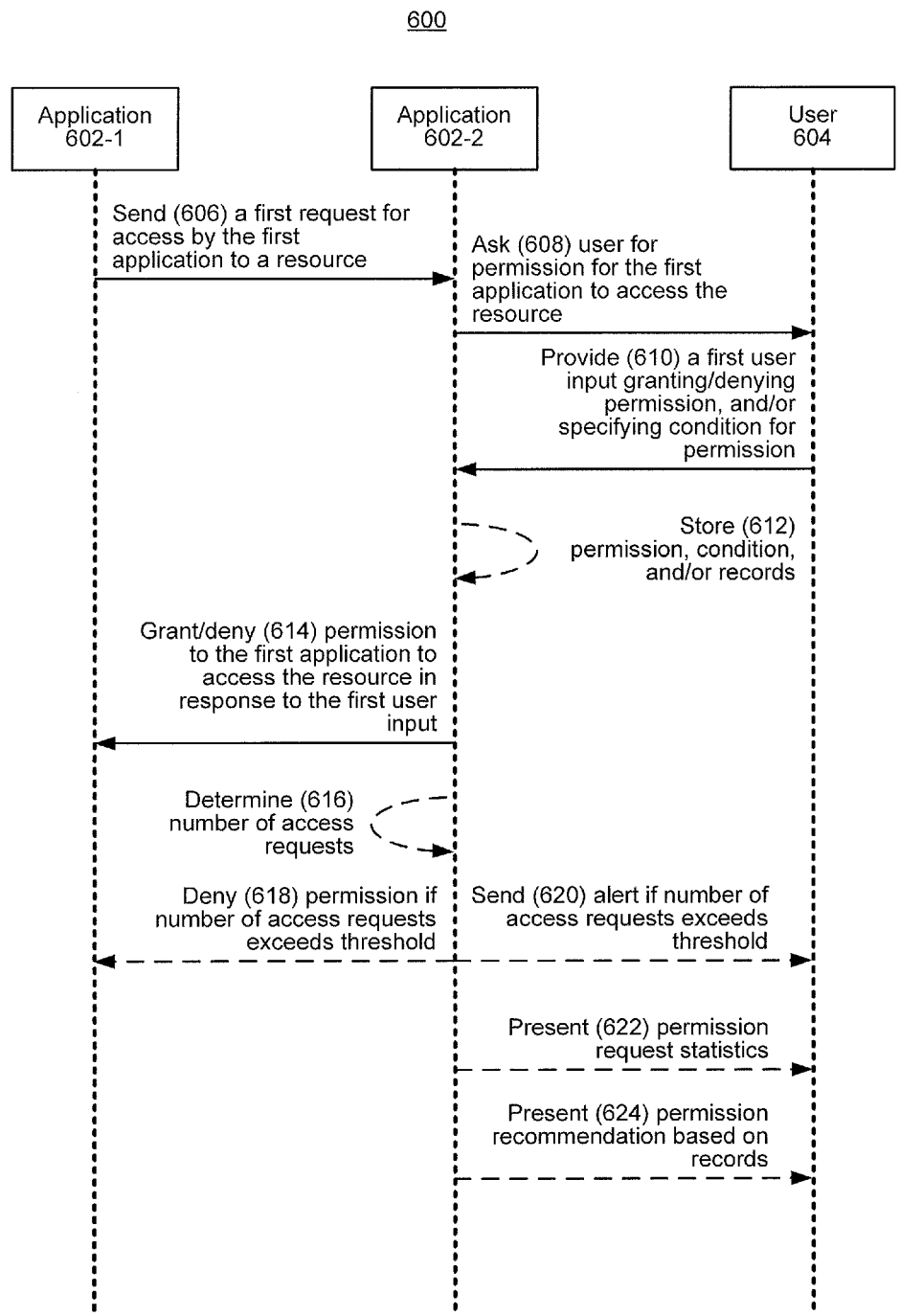
FIG. 6 is a flow diagram illustrating a method of managing permissions to access device resources, in accordance with some embodiments.

FIGS. 4A-4B illustrate exemplary GUIs 400 and 410, shown on a display of a client device 104, for managing permissions to access device resources and presenting access request statistics, in accordance with some embodiments. The GUIs 400 and 410 illustrate the processes described below, including the method 600 (FIG. 6). While FIGS. 4A-4B illustrate examples of GUIs, in other embodiments, a GUI displays user-interface elements in arrangements distinct from the embodiments of FIGS. 4A-4B.

FIG. 4A illustrates an exemplary GUI 400 of an application (e.g., a permission module 342, FIG. 3) for managing permissions of other applications to access resources of the client device 104-1. The GUI 400 allows users to provide user inputs (e.g., selection of user-interface elements 404) that specify permissions for accessing resources of the client device 104-1. The GUI 400 includes permission request prompt 402, and user-interface elements 404 for specifying permissions and conditions under which to grant or deny permission to access device resources.

In some embodiments, the GUI 400 is displayed in response to a user attempting to utilize a particular application feature that requires access to a device resource (e.g., retrieving directions from a current location to a destination using a mapping application, requiring use of location detection device 322 (FIG. 3) of client device 104 to determine the current location of the client device 104). In some embodiments, the GUI 400 is displayed in response to an application (distinct from the application for managing permissions) running a background process that requests access to device resources.

In some embodiments, the permission request prompt 402 includes text requesting the user to provide permission for an application to access a device resource. For example, the permission request prompt 402 asks the user of client device 104-1 whether the user would like to grant permission to "Application 01" to access a location detection device 322 and/or location detection module 334 to determine the current location of the client device 104-1. Various device resources for which permissions grant or deny access are described in greater detail with respect to FIG. 6.

In response to being asked to specify a permission, the user may select any of the displayed user-interface elements 404 to specify a permission. Each user-interface element 404 corresponds to a grant or denial of permission for the requesting application (e.g., "Application 01") to access the device resource. Different user-interface elements 404 correspond to different conditions under which to grant or deny permission to access resources, where the conditions represent granular settings for granting or denying permission (e.g., a specific number of times, time period, user, location, location resolution, etc. for which permission is granted or denied). Referring to the examples of FIG. 4A, selection of a user-interface element 404 allows a user to always grant Application 01 access to the resource (e.g., 404-1), grant access only once (e.g., 404-2), always deny access (e.g., 404-3), grant access for a specified duration (e.g., 404-4), or specify other optional permission conditions (e.g., 404-5). Selecting the user-interface element 404-5 triggers display of additional permission conditions that the user may specify (e.g., a specific resolution at which the location may be determined, a specific user, a specific location, etc.). The user may specify a single condition or multiple conditions. Various permissions and conditions for granting or denying permissions are described in greater detail with respect to FIGS. 5A-5B and 6.

FIG. 4B illustrates another exemplary GUI 410 of the application for managing permissions (e.g., permission module 342). The GUI 410 displays statistics for access requests received from applications (e.g., other client application modules 336 besides the permission module 342, FIG. 3) on an electronic device. As shown, the GUI 410 includes sections 412 for displaying access requests statistics for applications (e.g., section 412-1 for Application 01, section 412-2 for Application 02, etc.), and a user-interface element 414 for viewing detailed access request history for a respective application.

Sections 412 display details (e.g., retrieved from permission table 344, FIGS. 3 and 5A) regarding the permission for which statistics are displayed. In this example, section 412-1 includes the date and time at which the permission was created ("Permission Created On"), whether access was granted ("Access Granted"), the resource to which access was granted ("Resource"), a permitted duration of access ("Permitted Duration"), a permitted location of access ("Permitted Location"), a permitted user ("Permitted User"), and whether access is granted for a foreground or background process ("Foreground/Background"). Although not shown in the GUI 410, sections 412 may be configured to display other additional parameters or conditions that are applicable or specified by the user.

Furthermore, sections 412 display various statistics of access requests sent by an application (e.g., a client application module 336). In this example, statistics are shown for requests sent by Application 01 for access to a location-detection device 322 (FIG. 3) of client device 104-1. Statistics include the time of the last access request sent by Application 01 ("Time of Last Request"), the location from which the last access request was sent ("Location of Last Request"), the user of Application 01 (e.g., the user logged in) when the last access request was sent ("Requesting User of Last Request"), the number of access requests received on the date of viewing the statistics ("Number of Access Requests Today"), and the total number of access requests received since the permission was created ("Total Number of Access Requests"). Although not shown in the GUI 410, sections 412 may be configured to display other statistics of access requests.

By displaying permissions specified by a user, in conjunction with access request statistics of corresponding applications, the user is able to identify potentially malicious applications that are operating outside the permitted and defined boundaries of access. The user is also able to identify which applications are most resource-intensive in accessing device resources, and also which device resources are accessed by applications the most. Furthermore, based on the access request statistics, the application for managing permissions (e.g., permission module 342, FIG. 3) is also able to deny suspicious applications access to resources, provide alerts to users when suspicious activity is detected, and/or present permission recommendations to users.

Section 412-1 also includes an optional user-interface element 414 for viewing detailed access request history for a respective application. For example, selecting user-interface element 414 displays a GUI (not shown) which includes a detailed listing of each access request sent by Application 01, where each access request is displayed with data retrieved from stored records (e.g., records table 346 of FIGS. 3 and 5B, which includes the time of the request, the requesting user, the location of the request, etc.).

FIGS. 5A-5B illustrate exemplary data structures storing permissions and access request records, in accordance with some embodiments. In some embodiments, the permission table 344 (FIG. 5A) and the records table 346 (FIG. 5B) are stored in one or more modules or sub-modules of a client device (e.g., modules of memory 306 of client device 104, and/or sub-modules of permission module 342, FIG. 3). Alternatively, in some implementations, the permission table 344 and the records table 346 are stored in modules of a server system (e.g., social network system 108, FIG. 3), such that permissions may be managed, shared, and/or retrieved by multiple client devices associated with a single user. Furthermore, in some implementations, permission table 344 and/or records table 346 are configured to include and store additional fields not shown in FIGS. 5A-5B, such as additional parameters, conditions, statistics, and/or data regarding user-specified permissions or access requests.

FIG. 5A illustrates a permission table 344 (e.g., stored in memory 306 of client device 104, FIG. 3), which stores permissions for applications to access resources. As shown, entries of the permission table 344 correspond to permissions for respective applications for accessing device resources.

Permissions define the authorization or lack of authorization of applications (e.g., client application modules 336 of client device 104, FIG. 3) to access resources of the electronic devices in which they are stored. Each entry of the permission table 344 identifies the application for which a respective permission is defined ("Application ID"), the resource to which access is granted or denied ("Resource"), whether access to the resource is granted or denied ("Permission"), and the date and time at which the permission was defined ("Date/Time of Permission"). Optionally, the permission table 344 may specify conditions under which permission is granted or denied. For example, access may be permitted only for a specified duration ("Duration"), at a specific location ("Location"), and/or for a specific user ("User"). Furthermore, permissions may be limited to a particular resolution ("Location Resolution" for location-tracking resources), and/or to a foreground or background process ("Foreground/Background").

As an example, permission for "Application 01" to access a GPS device (or other Global Navigation Satellite System device) of the client device 104 (e.g., location detection device 322, FIG. 3) is granted indefinitely ("Always") for "User_01." Permission is limited to a resolution of a radius of 2000 ft from the location of the client device 104, and the GPS device may only be accessed when the Application 01 is running as a foreground process (e.g., an interactive mapping application that displays a current location of the client device 104) and not as a background process. Furthermore, the permission was provided (e.g., by received user inputs) at 2:05 AM on Nov. 25, 2014

FIG. 5B illustrates a records table 346 (e.g., stored in memory 306 of client device 104, FIG. 3) which stores records of access requests sent by an application. These records can be used for producing access requests statistics (e.g., as shown in the GUI 410, FIG. 4B). As shown, entries of the records table 346 include an identifying index number corresponding to a particular access request ("Request Index #"), the application requesting access to device resources ("Application ID"), the resource to which access was requested ("Resource"), the date and time at which the request was sent, (or alternatively, when permission was granted/denied) ("Date/Time of Request"), the user of the requesting application (e.g., the user logged in) when the access request was sent ("Requesting User"), the location from which the access request was sent ("Location of Request"), and whether access was granted or denied ("Result of Request"). Although not shown, additional details regarding the result of the access request may be included in the records table 346 (e.g., permitted duration, permitted location, etc.).

As an example, the access request "001" corresponds to a request sent by "Application 01" for access to a GPS device of the client device 104 (e.g., location detection device 322, FIG. 3). Continuing the example of the permission table 344 above, in response to the request, permission for "Application 01" to access the GPS device is granted (e.g., "Application 01" is granted access to the GPS device indefinitely ("Always")). Permission was granted in response to access request "001" at 2:05 AM on Nov. 25, 2014 at a location corresponding to GPS coordinates of (37.420591, −122.141330), while "User_01" was using "Application 01" (or using the client device 104).

FIG. 6 is a flow diagram illustrating a method 600 of managing permissions to access device resources, in accordance with some embodiments. The method 600 is performed on an electronic device (e.g., client device 104, FIGS. 1 and 3, where client device 104 is acting as a standalone device). FIG. 6 corresponds to instructions stored in a computer memory (e.g., memory 306 of the client device 104, FIG. 3) or other computer-readable storage medium.

A first application 602-1 (e.g., corresponding to a module of client device 104, such as a client application module 336, FIG. 3) sends (606) a first request to a second application 602-2 (e.g., corresponding to a permission module 342) for access by the first application to a resource of the electronic device. The first and second applications 602-1 and 602-2 run on an operating system of the electronic device.

Resources of the electronic device include sub-devices, components, features, applications, and/or other capabilities provided by the device. Examples include a microphone (e.g., audio input device 320 for capturing audio, FIG. 3), a messaging application of the electronic device (e.g., a client application module 348 for sending and receiving SMS text messages), a location-tracking device of the electronic device (e.g., location detection device 322 for determining the location of the client device 104), and a camera of the electronic device (e.g., image/video capture device 324 for capturing images or videos). Other examples include modules associated with respective sub-devices or components (e.g., image/video capture module 332, audio input module 332, and location detection module 334, FIG. 3)

In response to the first request, the second application 602-2 asks (608) a user 604 of the electronic device (e.g., user 102-1 of client device 104-1, FIG. 1) for permission for the first application 602-1 to access the resource. For example, the GUI 400 (FIG. 4A) is displayed with permission request prompt 402, asking the user 604 to specify a permission for "Application 01."

In some embodiments, the second application 602-2 determines, in response to the first request, that it is not currently authorized to allow the first application 602-1 to access the resource. In response to this determination, the user 604 is asked (608) for permission for the first application 602-1 to access the resource. For example, the first application 602-1 (e.g., "Application 01," corresponding to a client application module 336, FIG. 3) sends a request to the second application 602-2 (e.g., permission module 342) to access the microphone (e.g., audio input device 320 and/or corresponding audio input module 332) of the client device 104. Application 602-2 then searches the permission table 344 for any permissions corresponding to application 602-1 ("Application 01") for accessing the microphone. If no permission exists, the second application 602-2 asks the user 604 to specify a permission for the first application 602-1 to access the microphone.

After the second application 602-2 asks (608) the user 604 for permission for the first application 602-1 to access the resource, a first user input is received (610) (e.g., by application 602-2) that either grants or denies permission for the first application 602-1 to access the resource. In response to the first user input, the device uses the second application 602-2 to either grant or deny (614) permission to the first application 602-1 to access the resource.

In some embodiments, using the second application 602-2 to grant permission to the first application 602-1 to access the resource includes using the second application 602-2 to retrieve data from the resource. The second application 602-2 then provides the data to the first application 602-1. Thus, the second application 602-2 acts as a proxy through which the first application 602-1 accesses the resource (e.g., second application 602-2 retrieves GPS coordinates from location detection device 322 and provides the GPS coordinates to first application 602-1). In other implementations, once the first application 602-1 is authorized, the first application 602-1 accesses the resource directly, independently of the second application 602-2.

Conditions are limitations imposed on access to a resource and/or requirements to be satisfied in order for access to be permitted. In some embodiments, the first user input specifies (610) one or more conditions under which to grant or deny permission to the first application 602-1 to access the resource. The condition is stored (612) in memory allocated to the second application 602-2 (e.g., in permission table 344 of permission module 342, FIG. 3). The second application 602-2 uses the condition to determine (614) whether to grant permission to the first application 602-1 to access the resource in response to subsequent requests from the first application 602-1.

For example, the first user input specifies a one-time permission for the first application 602-1 to access the resource. After the second application 602-2 grants permission to the first application 602-1 to access the resource in response to the first user input, a second request is sent from the first application 602-1 to the second application 602-2 for access by the first application 602-1 to the resource. The second application 602-2 is not authorized to provide this access, because the first user input only authorized one-time access. Accordingly, in response to the second request, the second application 602-2 asks the user for permission for the first application 602-1 to access the resource again. A second user input is received, indicating whether to grant permission to the first application 602-1 to access the resource. The second application 602-2 grants or denies permission to the first application 602-1 to access the resource, in accordance with the second user input. In some implementations, the one-time permission grants the first application 602-1 permission to access the resource to retrieve data for only a single access request (e.g., a single photo captured with the image/video capture device 324, FIG. 3). In other implementations, the one-time permission grants the first application 602-1 permission to access the resource for a single session or instance of launching/executing the requesting application (e.g., mapping application may access GPS coordinates of the client device 104 until the user terminates and/or restarts the mapping application).

In some embodiments, the first user input specifies a time period in which to permit the first application 602-1 to access the resource. During the time period, the second application 602-2 is repeatedly used to automatically grant permission (i.e., without asking for additional user input) to the first application 602-1 to access the resource, in accordance with the first user input. The specified time period may be a range of dates during which access is permitted (e.g., access is permitted between Nov. 1, 2014 through Dec. 1, 2014), a range of time (e.g., access is permitted between 1:00 PM and 5:00 PM), a specified time limit (e.g., for one hour, etc.), or any combination of the foregoing (e.g., access is permitted between specified times for a specified range of dates). Alternatively, the first user input specifies a time period during which the first application 602-1 is denied access to the resource, with access being authorized outside of the time period.

In some embodiments, the first user input specifies a number of times that the first application 602-2 is permitted to access the resources. While the number of times has not been exceeded, the second application 602-2 is repeatedly used to automatically grant permission to the first application 602-1 to access the resource, in accordance with the first user input. For example, the first user input specifies a number of permitted accesses requests from the first application 602-1.

In some embodiments, the first user input specifies a permitted location at which to permit the first application 602-1 to access the resource. While a detected location of the electronic device corresponds to the permitted location, the second application 602-2 is repeatedly used to automatically grant permission to the first application 602-1 to access the resource, in accordance with the first user input. The specified permitted location may be a set of coordinates (e.g., GPS coordinates), a venue, organization, or entity associated with a detected location (e.g., a restaurant, the user's home, the user's workplace, etc.), or a predefined (e.g., geofenced) area within which (or outside of which) access is permitted (e.g., a permitted half-mile radius from a user's home). As an example, the first user input specifies that the first application 602-1 is permitted to access the camera of client device 104 (e.g., image/video capture device 324, FIG. 3) outside a specified radius of a location associated with a user's home. Thus, if the detected location of the client device 104 corresponds to GPS coordinates within the specified radius of the user's home, the first application 602-1 will be denied access to the camera of the client device 104.

In some embodiments, the first user input specifies a permitted user for whom the first application 602-1 is authorized to access the resource. When or while the user 604 of the electronic device is determined to be the permitted user, the second application 602-2 is repeatedly used to automatically grant permission to the first application 602-1 to access the resource, in accordance with the first user input.

The user of the electronic device is, for example, the user logged into the first application 602-1, second application 602-2, or operating system of the electronic device at the time of the first access request. In some implementations, determining whether the user 604 of the electronic device is the permitted user includes requesting and verifying user credentials (e.g., prompting the user to provide a username and password, bio-metric inputs, or any other identifying information).

In some embodiments, the condition (specified by the first user input in operation 610) allows access to the resource by a foreground process and/or a background process (e.g., by a foreground process but not a background process, or vice-versa) corresponding to the first application 602-1. Foreground processes include application processes for which operation (e.g., including access of the requested resource) is observable to the user 604. In some implementations, foreground processes are application processes that are run only when the application itself has launched/executed and is currently running. As an example, a foreground process of a mapping application includes retrieving current GPS coordinates of the client device 104 and displaying the corresponding position on a map to the user of the client device 104. In contrast, background processes include application processes for which operation (e.g., including access of the requested resource) is not observable to the user of the client device. In some implementations, background processes are application processes that are run simultaneously with other foreground/background processes, and/or when the application itself has not been launched/executed and is not currently running. For example, a background process of an application continually captures speech from the user using a microphone (e.g., audio input device 320, FIG. 3) of the client device 104, even when the user is not using the application that accesses the microphone. Denying the background process access to the microphone would prevent this potential invasion of user privacy.

In some embodiments, the resource includes a location-tracking device of the electronic device (e.g., location detection device 322, FIG. 3), and the first user input specifies a degree of resolution to be allowed for the first application 602-1 with respect to accessing the location-tracking device. The degree of resolution with respect to accessing the location-tracking device specifies, for example, the precision (in distance) with which a location of the client device 104 can be determined (e.g., detected current location of the client device 104 delineates an area having a specified radius within which the client device 104 is located). In some implementations, the first user input selects between a coarse or fine resolution for location tracking (e.g., coarse and fine resolutions corresponding to predefined precisions of location tracking, where a fine resolution has greater precision than a coarse precision), or between three or more available resolutions for location tracking.

In some implementations, the first user input specifies a combination of conditions under which to grant permission to the first application 602-1. For example, permission is granted to the application 602-1 to access the resource only for user 102-1 (a permitted-user condition), and only on specified dates (e.g., one or more specified days of the week) between specified times. Conditions under which to grant or deny permission to an application are not limited to those shown in FIGS. 5A-5B and described herein, and may include other limitations, requirements, parameters, resource-specific limitations, and/or levels of granularity in accessing resources.

In some embodiments, the electronic device stores (612) (e.g., in the records table 346, FIGS. 3 and 5B) records of multiple access requests sent by the first application 602-1 to the second application 602-2 for access by the first application 602-1 to the resource.

In some implementations, the second application 602-2 determines (616) a number of requests sent by the first application 602-1 to access the resource over a period of time (e.g., based on records stored in records table 346, FIGS. 3 and 5B). If the number of requests satisfies (e.g., exceeds, or equals or exceeds) a threshold, the second application 602-2 is used to deny (618) permission (e.g., automatically, without asking for additional user input) to the first application 602-1 to access the resource. The threshold may be specified by a user input or may be coded in the second application 602-2. Optionally, in accordance with the number of requests satisfying the threshold, an alert is provided (620) to the user of the electronic device (e.g., an alert is shown on a display of the client device 104, notifying the user of the suspicious application). The threshold thus may be used to identify and/or contain malicious applications (e.g., malware).

In some implementations, based on the stored records, one or more statistics are presented (622) to the user regarding the multiple requests. For example, the GUI 510 in FIG. 4B is shown on the display of the client device 104, which includes access request statistics based on stored records.

In some implementations, in response to multiple access requests sent by the first application 602-1, the device stores (612) (e.g., in the records table 346), for respective access requests, a record of a received respective user input granting or denying permission for the first application to access the resource (where user inputs are received after asking the user for permission), and/or a record of respective context information for the electronic device. Context information describes circumstances under which an access request is sent and/or permission for the access request is granted or denied. In some embodiments, context information includes locations of the electronic device when receiving the respective user inputs (e.g., a permission is specified while user was located at his home), and/or the date/times at which the respective user inputs are received (e.g., a permission is specified at 2:05 PM on Nov. 25, 2014). Examples of records of access requests, permissions provided, and context information are shown in the records table 346 of FIG. 5B.

In some embodiments, based on the stored records, a recommendation of a condition under which to grant or deny permission for the first application 602-1 to access the resource is presented (624) to the user. The electronic device identifies patterns of permissions provided by the user based on the stored records in the records table 346, and intelligently presents recommendations of conditions under which to grant or deny permissions. For example, the permission module 342 may include a machine-learning algorithm that develops recommendations. In one example, records in the records table 346 (FIGS. 3 and 5B) indicate that the user always grants permission (e.g., one-time permission) for the first application 602-1 to access a particular resource (e.g., audio input device 320 for capturing audio, FIG. 3) of the client device 104. Accordingly, in response to receiving a subsequent request from the first application 602-1 to access the particular resource, the application 602-2 recommends (e.g., by displaying a GUI prompt) that the user grant permission for the first application 602-1 to always be able to access the particular resource. In other examples, the application 602-2 identifies that the user always grants or denies permission for the first application 602-1 to access a particular resource under one or more conditions, and recommends that the user grant permission for the first application to always or never be able to access the particular resource under the one or more conditions. In still other examples, the application 602-2 identifies that the user always grants or denies permission for multiple applications to access a particular resource (e.g., under one or more conditions, or regardless of conditions) and recommends that the user allow all applications to always or never be able to access the particular resource (e.g., under the one or more conditions, or regardless of conditions).

Therefore, by using a trusted permissions application (e.g., permission module 342, FIG. 3) that is separate from the operating system of the client device, users are able to reliably identify which applications request permission to access device resources, while managing such permissions at a granular level. As a result, users are given greater confidence and security in using applications on their devices. Additionally, using an independently trusted application separate from the operating system allows enables greater compatibility with a wider range of devices, since the trusted permissions application will be isolated from system-wide updates to the operating system that may otherwise affect the flexibility and transparency of permissions features.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at an electronic device with one or more processors and memory storing instructions for execution by the one or more processors:
sending a plurality of requests, including a first request, from a first application to a second application for access by the first application to a resource of the electronic device, wherein the first and second applications run on an operating system of the electronic device;
in response to respective requests of the plurality of requests, including the first request, using the second application to ask a user of the electronic device for permission for the first application to access the resource;
receiving respective user inputs granting or denying permission for the first application to access the resource, comprising receiving a first user input providing permission for the first application to access the resource;
storing records of the respective requests, respective user inputs, and respective context information for the electronic device;
in response to the first user input, using the second application to grant permission to the first application to access the resource; and
based on the records, presenting a recommendation to the user of a condition under which to grant or deny permission for the first application to access the resource.

2. The method of claim 1, wherein the resource is selected from the group consisting of:
a microphone of the electronic device;
a messaging application of the electronic device;
a location-tracking device of the electronic device; and
a camera of the electronic device.

3. The method of claim 1, wherein the first user input specifies a one-time permission for the first application to access the resource, the method further comprising, after receiving the first user input and using the second application to grant permission to the first application to access the resource in response to the first user input:
sending a second request from the first application to the second application for access by the first application to the resource;
in response to the second request, using the second application to ask the user for permission for the first application to access the resource;
receiving second user input indicating whether to grant permission to the first application to access the resource; and
using the second application to grant or deny permission to the first application to access the resource, in accordance with the second user input.

4. The method of claim 1, further comprising determining, in response to the first request, that the second application is not currently authorized to allow the first application to access the resource;
wherein the user is asked for permission for the first application to access the resource in response to the determining.

5. The method of claim 1, wherein the first user input specifies a time period in which to permit the first application to access the resource, the method further comprising:
during the time period, repeatedly using the second application to automatically grant permission to the first application to access the resource, in accordance with the first user input.

6. The method of claim 1, wherein the first user input specifies a permitted location at which to permit the first application to access the resource, the method further comprising:

while a detected location of the electronic device corresponds to the permitted location, repeatedly using the second application to automatically grant permission to the first application to access the resource, in accordance with the first user input.

7. The method of claim 1, wherein the first user input specifies a permitted user for whom the first application is authorized to access the resource, the method further comprising:
when the user of the electronic device is determined to be the permitted user, repeatedly using the second application to automatically grant permission to the first application to access the resource, in accordance with the first user input.

8. The method of claim 1, wherein:
the resource comprises a location-tracking device of the electronic device; and
the first user input specifies a degree of resolution to be allowed for the first application with respect to accessing the location-tracking device.

9. The method of claim 8, wherein the first user input selects between a coarse or fine resolution for location tracking.

10. The method of claim 1, further comprising:
determining a number of requests sent by the first application to access the resource over a period of time; and
in accordance with the number of requests satisfying a threshold, using the second application to deny permission to the first application to access the resource.

11. The method of claim 10, further comprising, in accordance with the number of requests satisfying the threshold, providing an alert to the user of the electronic device.

12. The method of claim 1, further comprising:
based on the records, presenting one or more statistics regarding the plurality of requests to the user.

13. The method of claim 1, wherein the context information comprises at least one of locations of the electronic device when receiving the respective user inputs and times at which the respective user inputs are received.

14. The method of claim 1, wherein using the second application to grant permission to the first application to access the resource comprises:
using the second application to retrieve data from the resource; and
providing the data from the second application to the first application.

15. An electronic device, comprising:
one or more processors; and
memory storing one or more programs for execution by the one or more processors, the one or more programs including instructions for:
sending a plurality of requests, including a first request, from a first application to a second application for access by the first application to a resource of the electronic device, wherein the first and second applications run on an operating system of the electronic device;
in response to respective requests of the plurality of requests, including the first request, using the second application to ask a user of the electronic device for permission for the first application to access the resource;
receiving respective user inputs granting or denying permission for the first application to access the resource, comprising receiving a first user input providing permission for the first application to access the resource;
storing records of the respective requests respective user inputs and respective context information for the electronic device;
in response to the first user input, using the second application to grant permission to the first application to access the resource; and
based on the records, presenting a recommendation to the user of a condition under which to grant or deny permission for the first application to access the resource.

16. A non-transitory computer-readable storage medium storing one or more programs for execution by one or more processors of an electronic device, the one or more programs corresponding to a second application distinct from a first application and from an operating system of the electronic device on which the first and second applications are configured to run, the one or more programs including instructions for:
receiving a plurality of requests, including a first request, from the first application for access by the first application to a resource of the electronic device;
in response to respective requests of the plurality of requests including the first request, asking a user of the electronic device for permission for the first application to access the resource;
receiving respective user inputs granting or denying permission for the first application to access the resource comprising receiving a first user input providing permission for the first application to access the resource;
storing records of the respective requests, respective user inputs, and respective context information for the electronic device;
in response to the first user input, granting permission to the first application to access the resource; and
based on the records presenting a recommendation to the user of a condition under which to grant or deny permission for the first application to access the resource.

* * * * *